Oct. 4, 1927.
A. HOWARD
1,644,591
IGNITION CONTROLLING APPARATUS
Filed Jan. 12, 1925
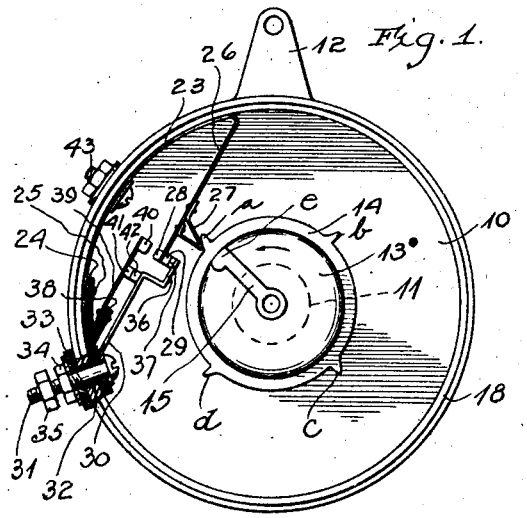
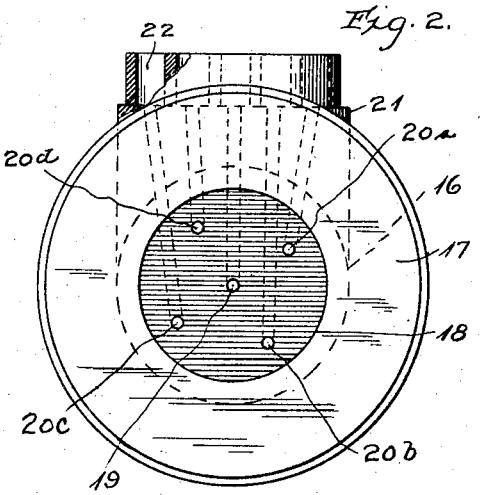
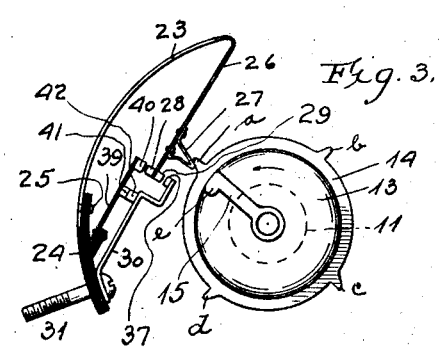
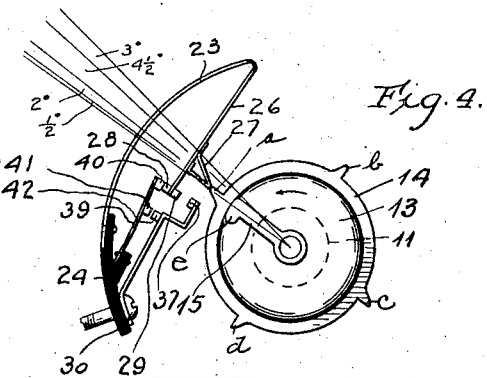
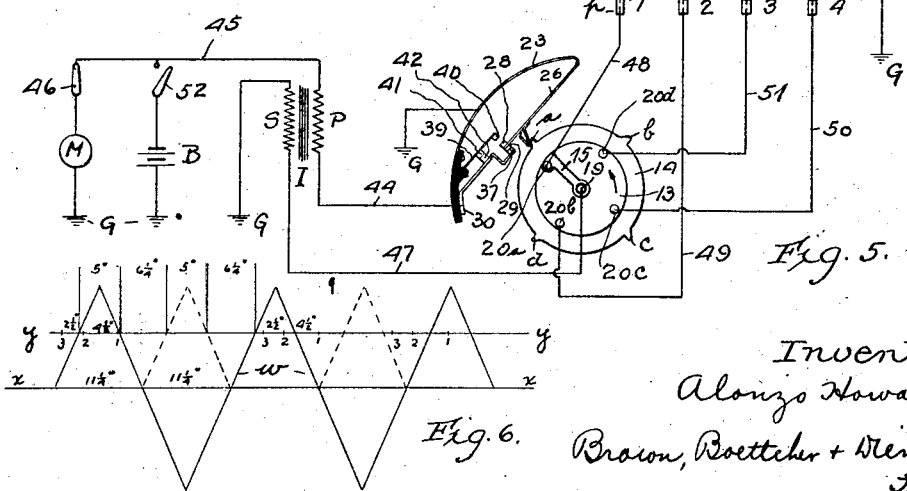
Inventor,
Alonzo Howard.
Brown, Boettcher + Wenner
Atty's.

Patented Oct. 4, 1927.

1,644,591

UNITED STATES PATENT OFFICE.

ALONZO HOWARD, OF CHICAGO, ILLINOIS, ASSIGNOR OF ONE-FIFTH TO ALBERT F. BURCHARD, OF CHICAGO, ILLINOIS.

IGNITION-CONTROLLING APPARATUS.

Application filed January 12, 1925. Serial No. 1,729.

My invention relates to ignition controlling apparatus which may be adapted for use with different types of explosive engines but which is of particular utility and efficiency in connection with Ford engines. In my Patents Nos. 1,466,719 and 1,466,720 of September 4, 1923, and in my Patent No. 1,536,582, dated May 5, 1925, I disclose ignition controlling apparatus whose main feature is the provision of a series of distinct sparks for each gas charge in each cylinder of the engine so that proper and complete explosions and combustion of the gases is at all times secured and the running efficiency of the engines at starting as well as intermediate and higher speed is greatly increased.

In the arrangement of the application above referred to, several distinct sparks are assured for each gas charge in a cylinder and for certain reasons the intervals between the sparks of a series are longer than the alternation length of the magneto wave on which the engine is operated. The connection of a Ford magneto relative to the engine is such that the current wave is at maximum strength when the pistons are closest to proper position in the cylinders for ignition, and to get the most efficient results the ignition controlling apparatus should be designed to get its sparking current from the wave at such time. The wave of the Ford magneto delivers 32 alternations, 16 positive and 16 negative, for each revolution of the cam shaft, each alternation being $11\frac{1}{4}°$ in extent, and in order therefore to take advantage at the proper time of the maximum current strength of the wave, that is when the pistons are closest to the firing position, some or all of the sparks of a series should occur within the alternation length and sufficiently up on the curve to produce sufficient current strength for efficient ignition.

Where a single breaker structure with a single set of contacts, or several breaker structures each with a single set of contacts, are used as in my application referred to above, the intervals between operations of the breaker or breakers must be sufficient to allow the breaker structures to overcome the effects of inertia and also to permit of sufficiently long closure intervals to insure proper saturation of the induction coil when batteries are used instead of the magneto. However, when such intervals are of sufficient length to take care of inertia and battery operation, they are too long to permit the spark series to come within a wave alternation and at times some or all of the sparks of a series occur at a time when the wave is not of maximum strength.

Another disadvantage of an arrangement such as disclosed in my application referred to is that, where a single breaker structure is used it must operate so many times during each revolution of the cam shaft that it will soon wear out, and where several breaker structures are used delicate adjustment is required of the breaker structures with reference to the cam element in order to insure proper operation.

The object of my present invention is to provide simple mechanism which will permit the formation of a series of ignition sparks for each gas charge of a cylinder at a time when the wave is at maximum strength and the respective piston is closest to the position for firing. Another object is to provide such mechanisms in the form of a single spring structure involving a main spring with which the cam cooperates and a number of contacts controlled in sequence by the main spring to produce two or more distinct closures and openings of the primary circuit when a cam tooth or other cam formation cooperates with the main spring. With my improved arrangement the sparks of a series can be brought closer together and well within the wave alternation length and each spark of a series will be the result of an independent closure of the primary circuit followed by an interruption thereof so that the sparks of a series will be separate, distinct and efficient. My improved arrangement also permits the spring structure to fully recuperate from inertia and other mechanical effects after an operation thereof by the cam element. For example, with a Ford engine having four cylinders, the cam will have four teeth so that the spring structure will have ample time to recuperate while the cam travels 90° after each cooperation with the spring structure.

Another advantage of my improved arrangement is that the breaker structure is a self-contained single structure whose contacts can be adjusted before insertion of the structure in the cam housing and which can readily be inserted in the housing and secured without requiring delicate adjustment.

My invention and its various phases and features will be clearly understood by reference to the accompanying drawing in which Fig. 1 is a front elevational view of the circuit controlling mechanism housing and contents with the distributor head removed;

Fig. 2 is an inner side view of the distributor head;

Figs. 3 and 4 are views of the breaker structure and cam showing different relative positions;

Fig. 5 is a diagram showing the circuit connections; and

Fig. 6 is a diagrammatic view showing the relation of the sparks to the magneto wave.

On the drawing 10 represents the housing or cup which is secured concentric with the cam shaft 11 and is provided with the lug 12 connected in practice by levers with the steering wheel frame so that the cup may be rotated by the driver to effect advance or retard of the sparking. Within the cup is the cam member 13 secured on the end of the cam shaft and having the cam flange 14 provided with the cam teeth $a$, $b$, $c$ and $d$, there being four of these teeth as the device shown is intended for use with a four cylinder engine. On the outer end of the cam member is the radially extending distributor brush 15.

Fig. 2 shows the distributor head which comprises the hub 16 having the flange 17 which fits within the rim 18 of the cup member. Within the hub 16 is the cylindrical pocket 18 for accommodating the cam member. Terminating at the inner wall of the pocket 18 is the central collector segment 19 around which are spaced the distributor segments $20^a$, $20^b$, $20^c$ and $20^d$, these segments extending through a lug 21 on the hub 16 and terminating at the bottom of sockets 22, which sockets receive the ends of the leads which convey the sparking current to the engine spark plugs. When the head is applied to the cup the collector segment 19 will be opposite the inner end of the distributor brush 15 and the distributor segments spaced 90° apart, will be in the path of the outer end $e$ of the distributor brush so that when the cam member rotates sparking current will be distributed from the segment 19 in succession to the distributor segments as will be shown more fully later.

The primary circuit controlling breaker unit which I have shown comprising the arcuate section 23 whose radius of curvature is the same as that of the inner cylindrical surface of the cup member 10. This arcuate section extends from a piece of insulating material 24 such as fiber which is also arcuate, the section 23 being shown secured at its end as by means of a rivet 25. Extending from the opposite end of the arcuate section is the main spring or cam lever 26 to which is secured the abutment 27 extending radially in the path of the cam teeth $a$, $b$, $c$ and $d$, on the cam member. At its inner end the main spring or cam lever carries the upper and lower contact point 28 and 29 of suitable contact material. A contact supporting plate 30 extends substantially parallel with the main spring from the opposite side of the cup 10 where it is secured in place by means of a terminal screw 31 which extends through the plate end and the cylindrical wall of the cup 10. To insulate the plate and screw from the cup the end of the insulating piece 24 is interposed between the plate and the inner side of the cup wall, while an insulating bushing 32 extends through the screw receiving passageway in the wall and the insulating washer 33 engaging against the outside of the wall, the terminal screw being securely held in place by the nut 34 between which and the nut 35 a conductor may be secured for connecting the screw and consequently the plate 30 in circuit. At its inner end the plate 30 is deflected downwardly and then inwardly to form a step 36 for supporting the contact point 37 which is normally engaged by the contact point 29 of the main spring.

The insulating piece 24 has an inwardly extending arm 38 to which the auxiliary spring 39 is secured at its outer end to be supported above the plate 30. At its inner end this auxiliary spring carries the contact point 40 in position to be engaged by the contact 28 when the main spring is swung outwardly by the cam member. Intermediate its ends the auxiliary spring has the contact point 41 which normally engages with the contact point 42 on the plate 30. A bolt 43 extending through the arcuate sections 23 of the breaker structure and the cylindrical wall of the cup 10 assists the terminal screw 31 in holding the breaker unit securely in place within the cup 10 in position for proper cooperation with the cam member. The main spring member 26 is thus in electrical contact with the cup 10, or in other words, it is grounded.

Fig. 5 diagrammatically shows the breaker and distributor mechanism connected for service. The main spring or cam lever 26 is grounded as indicated at G. The contact supporting plate 30 is connected by conductor 44 with one terminal of the primary winding P of the induction coil I, the other terminal of this winding connecting with conductor 45 with which the magneto M may be connected by means of a switch 46, the other terminal of the magneto being grounded. One terminal of the secondary winding S of the induction coil is grounded and the other terminal is connected by conductor 47 with the collector segment 19 of the distributor head. Distributor segment 20ª is connected by conductor 48 with the spark plug *p* of cylinder No. 1, segment 20ᵇ being connected by conductor 49 with the spark plug of cylinder No. 2, segment 20ᶜ being connected by conductor 50 with the plug of cylinder No. 4 and segment 20ᵈ being connected by conductor 51 with the plug of cylinder No. 3, the other terminals of the plugs being connected with ground as indicated. The battery B is adapted for connection with the conductor 45 through a switch 52, the other terminal of the battery being grounded. The arrangement shown is intended particularly for engines of the Ford type for which the standard Ford magneto is provided. This magneto has sixteen poles, eight positive and eight negative which travel with the engine shaft, and there are sixteen current collector coils, so that for each revolution of the engine shaft there will be eight complete current waves or sixteen alternations. The cam shaft is connected to rotate once for every two revolutions of the engine shaft so that the wave through the primary side of the ignition circuit will have 32 alternations, sixteen positive and sixteen negative, for each revolution of the cam shaft.

In Fig. 6, *w* represents the alternating current wave generated by the Ford magneto, and in order to make my invention more plain, I have shown the negative alternations in dotted lines between the positive alternations above the line X—X. In engines of the Ford type the arrangement of the magneto is such that when the piston of a cylinder is closest to its firing position the magneto wave will be at maximum strength, it being understood that the wave strength ranges from zero to maximum as the magnet poles travel past the collector coils. There being 32 alternations per revolution of the cam shaft, each will be 11¼° in extent, but along the neutral line X—X the current strength is nothing so that sparking current must be taken from some distance up on the curve in order to get primary current of sufficient force to insure secondary or sparking current of adequate strength to produce strong, sharp sparks. To illustrate my invention I have chosen to take current from the curve along the line Y—Y, thus using the upper or peak sections of the alternations of say 5° in width, I have found that this part of the curve will at all times insure sufficient current for good sparking, and at the same time allowing sufficient time for the generation of a series of sparks from such 5° section and at a time when the piston is ready for an explosion to start it on its crank driving trip in the right direction. As has already been stated, where a single breaker with only a single set of contacts is used, or where several breakers each with only a single set of contacts are used, it is impossible, on account of inertia or other conditions, to crowd a number of sparks into such limited 5° sections of the wave. However, with my improved breaker construction this can be readily accomplished.

The cam member rotates in the direction indicated by the arrow and in Fig. 1 the cam tooth *a* is about to cooperate with the breaker structure. The contacts 29 and 37 being in engagement the primary circuit is closed so that the induction coil is being charged from the magneto as shown in Fig. 5. When the cam member travels a distance, the tooth *a* engaging against abutment 27, will raise the spring 26 to disengage the contacts 29 and 37 as shown in Fig. 3 and the primary circuit will be opened so that the induction coil will discharge and deliver a spark to the plug of cylinder No. 1, the secondary current traveling from the secondary winding of the induction through conductor 47, segment 19, distributor brush 15, distributor segment 20ª, conductor 48, to the spark plug of cylinder #1, to ground, and back to the secondary coil, when the first spark will be produced in cylinder #1. Such opening of the primary circuit was accomplished after say 3° of rotation of the cam member (Fig. 4).

As the cam member continues the upper contact 28 will come into engagement with contact 40 of the auxiliary spring 39, say after 4° rotation of the cam member. We then have the second closure of the primary circuit as follows: from the magneto to the primary winding, conductor 44, plate 30, contacts 42 and 41, contacts 40 and 28, main spring 26, and to ground back to the magneto. The induction coil will now be again charged and then after the next ½° rotation of the cam member the main spring will be raised its maximum distance and the auxiliary spring deflected to disengage contacts 41 and 42 to cause the second break of the primary circuit and consequently the formation of the second spark in cylinder #1.

As the cam member advances from the position shown in Fig. 4, the main spring 26 moves inwardly along the trailing side of the tooth *a* and after say two degrees of travel of the cam member the contact 41 will be returned to the contact 42 and then before the contacts 40 and 28 separate we will have the third closure of the primary circuits by way of plate 30, contacts 42, 41, contacts 40 and 28, and the main spring, and the induction coil will again be charged, and then after the next say ½° of travel of the cam member the main spring will drop back into normal position behind the tooth *a* to break the primary circuit at contacts 40 and 28 and re-establish closure of the primary circuit by engagement of contacts 29 and 37.

When the contacts 40 and 28 were separated the induction coil discharged and the third spark was formed in cylinder No. 1. Thus within a travel of 10° of the cam tooth a there were three distinct openings of the primary circuit and the formation of three distinct sparks in cylinder No. 1, the first and second sparks being 4½° apart and the second and third sparks 2½° apart, that is 7° between the first and third sparks, the longest distance between consecutive sparks being less than the 5° section of the curve, and at the second positive alternation the second and third sparks are shown within this 5° section so that at least two of the three sparks of each series are close to the peak or maximum strength of the wave. By taking 5° as the working section of the curve it will leave 6¼° between alternations where the current strength is not so great. In rotating the cup 10 with the breaker structure to adjust for advance or retardation of the sparking under different conditions of operation of the engine the series of breaks or sparks may be shifted along the curve, but as the distance between the first and last spark is 7° the spark series will always bridge the 6¼° of inefficient current strength and at least one of the sparks will be above the 5° line Y—Y. An extreme condition is shown at the last alternation in Fig. 6 where only the first spark is within the 5° zone and very close to peak or maximum current strength. Thus each cylinder for each gas charge therein will receive under any condition of operation at least one powerful efficient spark, and under normal running conditions there will be at least two such sparks, and the most efficient operation under all conditions is therefore fully assured, particularly at starting of the engine when powerful sparking is so necessary. After tooth a has cooperated with the breaker structure, tooth b becomes effective after a 90° rotation of the cam member, thus allowing ample time for complete reciprocation of the breaker.

Each cam tooth engages only with the main spring of the breaker structure and the movement of the main spring causes the first opening of the primary circuit which opening is followed by the other closures and openings of the primary circuit, the intervening space of 90° between cam teeth giving the breaker structure ample and sufficient time to be fully restored to operative position after any inertia or other influences, and distinct openings are assured so that there will be a succession of distinct primary openings and the serving of at least one and under certain conditions three distinct, clean cut sparks for each gas charge in each cylinder. Although the operation of the breaker is very rapid there will be ample time after each opening of the primary circuit for complete charging or saturation of the induction coil. When the battery is switched in instead of the magneto, the control of the primary circuit by the main spring 26 and plate 30 will be depended upon and as there are 90° of intervals between the cam teeth the battery will have ample time after each opening of the primary circuit to fully recharge the induction coil. The intervals between breaks caused by contacts 41 and 42, and 28 and 40, may be too rapid for the battery except perhaps at low speed, but, as stated, the first break will be followed by sufficient interval to permit the battery to function properly to cause the production of a powerful spark.

The mechanical construction of the breaker structure is very simple. The various contacts can be accurately adjusted before the breaker structure is inserted into the cup 10 and then when the bolts 31 and 43 are applied the structure will be in accurate position to efficiently cooperate with the cam element. It is understood that the construction and arrangement of the breaker can be modified and that the intervals between operation of the various contacts can be changed as desired and as necessary to obtain the best results.

I claim:—

1. In ignition controlling apparatus, a circuit breaker structure, a single circuit controlled thereby, an actuating member, a main contact member for said breaker structure adapted for cooperation with said actuating member, and a plurality of other contact members associated with said main contact member, the cooperation of said actuating member with said main contact member causing a series of closures and reopenings of the circuit controlled by said breaker structure.

2. In ignition controlling apparatus, the combination of a single circuit controlling mechanism comprising a main contact member and a plurality of associate contact members, an actuating member for cooperating with the main contact member, and contacts arranged on said main contact member and associate contact members to be operated to cause a series of closures and openings of said circuit during each cooperation of said actuating member with said main contact member.

3. In combination, a single electrical circuit, controlling mechanism therefor, an actuating member for said controlling mechanism, a main contact member for said controlling mechanism actuated by said actuating member, a companion contact member normally engaged by said main contact member to close said circuit, an auxiliary contact member normally engaged with said companion contact member but separated from said main contact member, each cooperation of said main contact member with said actuating member causing successively separation of said main and companion contacts, engagement of said main contact member and auxiliary contact member, and separation of said auxiliary and companion contact members, return of said main contact member to normal position restoring such contacts to normal position, whereby said circuit will be successively closed and reopened.

4. In an ignition system, a single alternating current circuit, circuit controlling mechanism comprising a main contact member and a plurality of associate contact members, interrelated contacts on said contact members, an actuator member for said main contact member driven in timed relationship with the alternations of the current flowing through said circuit, each actuation of said main contact member resulting in arrangements of said contacts to affect a series of closures and reopenings of said circuit.

5. In an ignition system, an alternating current circuit, circuit controlling mechanism comprising a main contact member and a plurality of associate contact members, interrelated contacts on said contact members, an actuator member for said main contact member driven in timed relationship with the alternations of the current flowing through said circuit, each actuation of said main contact member resulting in arrangements of said contacts to affect a series of closures and reopenings of said circuit, the intervals between the openings of each series being less than the length of the current wave alternation.

6. In combination, an electrical circuit, circuit breaker mechanism comprising a contact lever and a plurality of contacts controlled thereby, an actuator for said contact lever, actuation of said contact lever causing association of said contacts to affect a series of interruptions of said circuit, said series being within the alternation length of the current flowing through said circuit.

7. In an ignition system, the combination of a cam member having cam formations thereon corresponding in number with the cylinders of an engine to be served, an ignition circuit, a controlling structure for said circuit, said structure comprising a main contact member and a plurality of associated contact members, said main contact member being in the path of said cam formations to be periodically actuated thereby, the arrangement of said contact members being such that for each actuation of said main contact member the contacts of said members will cooperate to cause a series of interruptions of said circuit and thereby a series of sparks in the corresponding cylinder.

In witness whereof, I hereunto subscribe my name this 2nd day of January, 1925.

ALONZO HOWARD.